R. J. SCHEIDT.
VEHICLE SPRING.
APPLICATION FILED SEPT. 29, 1914.
1,167,938.
Patented Jan. 11, 1916.
2 SHEETS—SHEET 2.
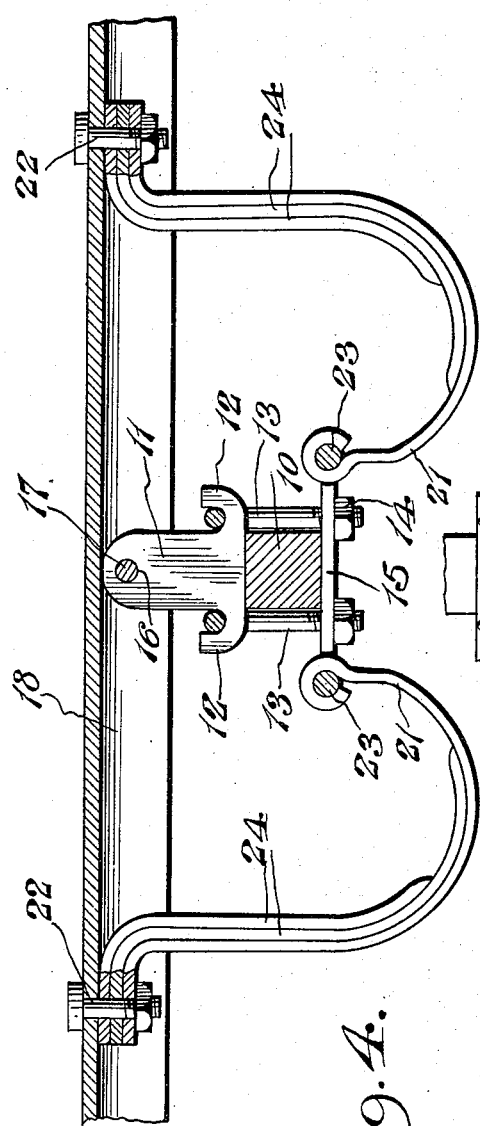
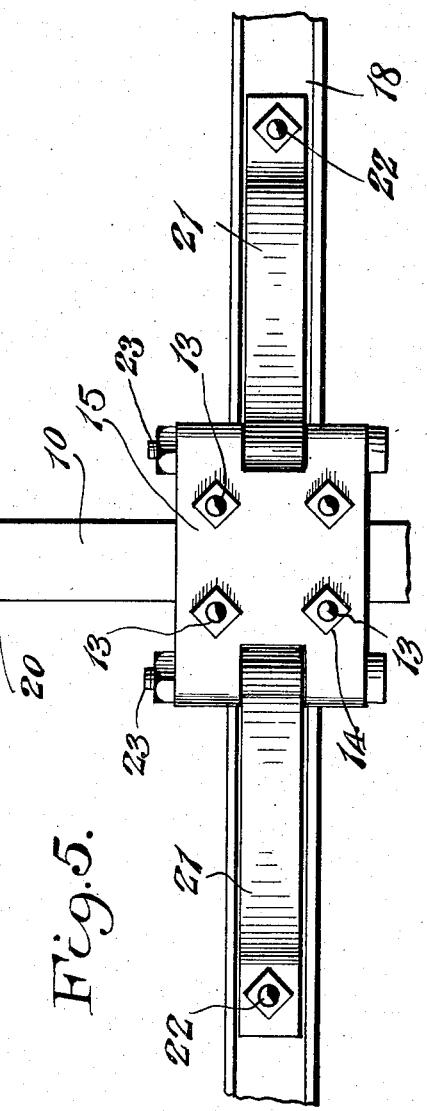
Witnesses
Inventor
R.J. Scheidt.
By
Attorney

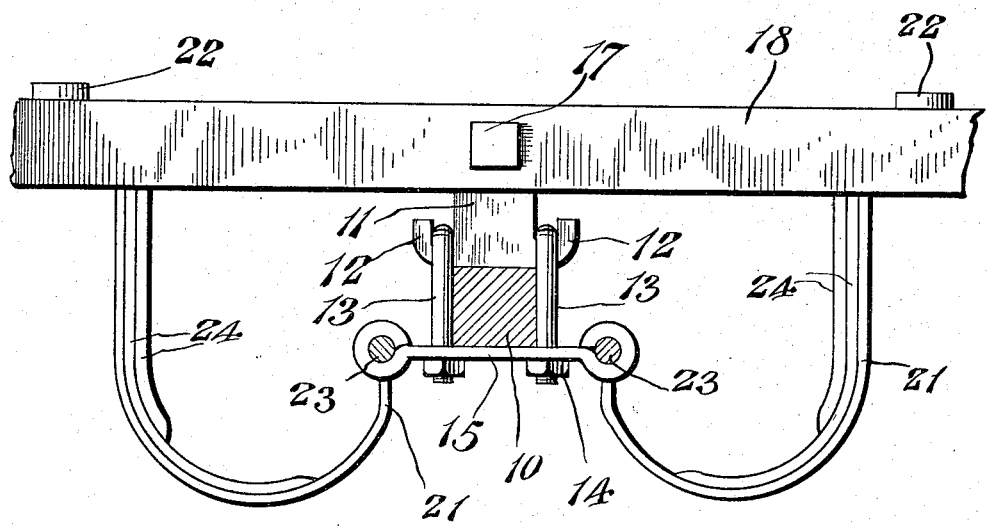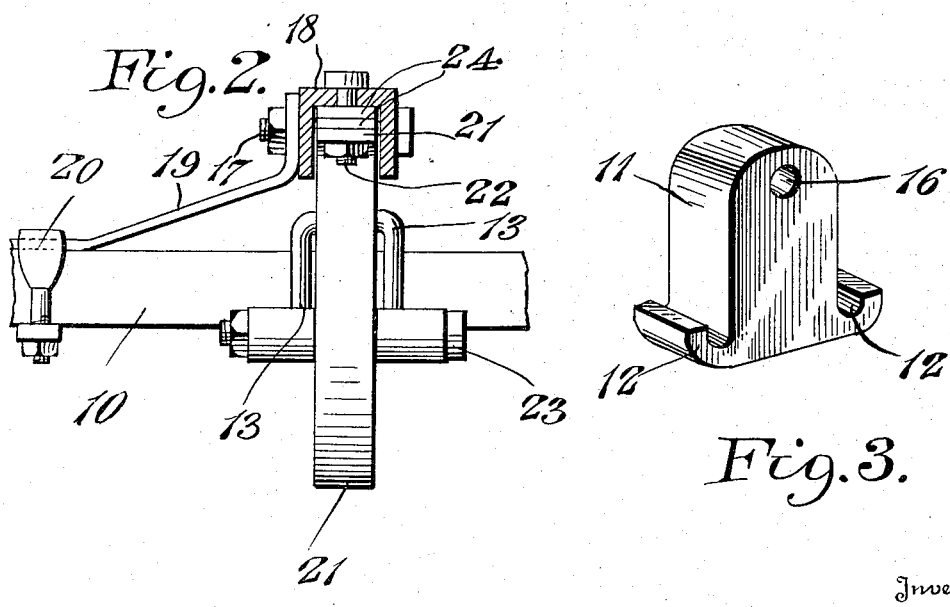

UNITED STATES PATENT OFFICE.

ROBERT J. SCHEIDT, OF CALIFORNIA, MISSOURI, ASSIGNOR OF ONE-FOURTH TO ROY L. KAY, OF CALIFORNIA, MISSOURI.

VEHICLE-SPRING.

1,167,938.  Specification of Letters Patent.  Patented Jan. 11, 1916.

Application filed September 29, 1914. Serial No. 864,063.

*To all whom it may concern:*

Be it known that I, ROBERT J. SCHEIDT, a citizen of the United States, residing at California, in the county of Moniteau and State of Missouri, have invented certain new and useful Improvements in Vehicle-Springs; and I do hereby declare the following to be a full, clear, and exact description of the invention, such as will enable others skilled in the art to which it appertains to make and use the same.

This invention relates to springs for various types of vehicles, such as railway rolling stock, carriages, wagons, and motor vehicles, and has for its object to provide a spring of novel and efficient construction especially designed and arranged to absorb shocks incident to abrupt starting and stopping of the vehicle.

With this and other objects in view, the invention consists in the novel construction, arrangement and formation of parts as will be hereinafter specifically described, claimed and illustrated in the accompanying drawings, in which:

Figure 1 represents a side elevation of the spring applied to use. Fig. 2 represents an end elevation of the spring. Fig. 3 represents a perspective view of a part of the securing means for the spring removed. Fig. 4 represents a view similar to Fig. 1, showing parts of the spring supporting means broken away, and Fig. 5 represents a bottom plan view of the spring.

Referring to the drawing in detail, wherein similar reference numerals designate corresponding parts throughout the several views, the numeral 10 indicates the axle of a vehicle which is preferably angular in cross section, as clearly illustrated in Fig. 1. A block 11 is positioned upon the axle 10 and is provided with a pair of laterally extending and upwardly curved ears 12 over which the web portions of a pair of U bolts 13 are engaged. The lower threaded extremities of the bolts 13 are provided with nuts 14 rigidly clamping a plate 15 against the lower face of the axle 10 and disposed transversely of the latter and longitudinally of the line of draft of the vehicle (not shown). The upper portion of the block 11 is formed with a transverse aperture 16 receiving a bolt or equivalent means 17 pivotally securing said block between the parallel portions of an inverted channel iron 18 which latter is reliably secured to the body of the vehicle (not shown). The channel iron 18 is braced against swinging movement laterally of the vehicle by a brace 19 pivotally secured by the bolt 17 at its upper end and secured at its lower end to the axle 10 by a clip 20.

Oppositely arranged substantially J shaped springs 21 are secured at their upper angularly directed ends to the web portion of the channel iron 18 by bolts or equivalent means 22 at points forwardly and rearwardly of the pivotal axis 17 of the block 11. The adjacent extremities of the springs 21 are curved inwardly and upwardly toward the front and rear ends of the plate 15 and are secured to bolts 23 suitably fixed in the front and rear ends of said plate 15. The springs 21 are reinforced and strengthened by additional leaf springs 24 secured by the bolts 22.

In use, it is evident that the axle 10 is permitted pivotal movement on its axis 17 relative to the channel irons 18 on which the body of the vehicle is supported. The pivotal movement relative to the channel irons and axle is retarded and cushioned by the springs 21 and 24.

What I claim is:

1. In combination, a vehicle axle, a support arranged above said vehicle axle, a block rigidly secured to said axle, means pivotally securing the upper extremity of said block with said support including a plate arranged under said axle, and springs connecting said support with said plate at points forwardly and rearwardly of said axle.

2. In combination, an axle, a block secured on top of said axle, a support pivotally secured to said block, a plate secured under said axle, and oppositely arranged curved springs connecting said plate with said support.

3. In combination, an axle, a block rigidly secured on top of said axle, a support pivotally secured to said block, a plate rigidly secured beneath said axle, and oppositely arranged substantially J-shaped springs, connecting the opposite ends of said plate with said support at points forwardly and rearwardly of said axle.

4. In combination, an axle, a support arranged above said axle, a block pivotally secured to said support having a pair of upwardly curved ears, a plate arranged under said axle, means engaged with said upwardly curved ears and extending through said plate for securing said block and said plate in position upon said axle, and oppositely arranged substantially J-shaped springs, connecting the opposite ends of said plate with said support, at points forwardly and rearwardly of said axle.

5. In combination, an axle, a support arranged above said axle, means pivotally connecting said axle with said support, means for retarding and cushioning the pivotal movement between said support and said axle, and a brace rigidly secured at one end to said axle and pivotally secured at the opposite end to said support.

6. In combination, an axle, a support arranged above said axle, means pivotally connected said axle with said support, means for retarding and cushioning the pivotal movement between said support and said axle, and a brace rigidly secured at one end to said axle and pivotally secured at its opposite end at the point of pivotal connection of said axle with said support.

7. In combination, a vehicle axle, a support arranged above said axle, a block rigidly secured to said axle, means pivotally securing the upper extremity of said block with said support, a brace rigidly secured at one end to said axle and at the opposite end to said support, and springs connecting said support with said plate at points forwardly and rearwardly of said axle.

8. In combination, an axle, a channel iron support arranged above said axle, a block pivotally secured between the parallel portions of said channel iron support, and disposed upon said axle, a plate disposed beneath said axle, means rigidly securing said block and said plate above and below said axle, and oppositely arranged substantially J-shaped springs connecting the opposite ends of said plate with said channel iron support at points forwardly and rearwardly of said axle.

In testimony whereof I affix my signature in presence of two witnesses.

ROBERT J. SCHEIDT.

Witnesses:
 Roy L. Kay,
 Jacob Hott.

Copies of this patent may be obtained for five cents each, by addressing the "Commissioner of Patents, Washington, D. C."